United States Patent
Dodd et al.

(10) Patent No.: US 6,179,557 B1
(45) Date of Patent: Jan. 30, 2001

(54) TURBINE COOLING

(75) Inventors: Alec G Dodd; Jagnandan K Bhangu, both of Derby (GB)

(73) Assignee: Rolls-Royce plc, London (GB)

(*) Notice: Under 35 U.S.C. 154(b), the term of this patent shall be extended for 0 days.

(21) Appl. No.: 09/351,133

(22) Filed: Jul. 12, 1999

(30) Foreign Application Priority Data

Jul. 18, 1998 (GB) .................................................. 9815611

(51) Int. Cl.$^7$ ...................................................... F01D 5/14
(52) U.S. Cl. .......................... 415/115; 415/108; 415/173.1
(58) Field of Search .................................... 415/108, 115, 415/116, 117, 173.1, 173.3, 173.4

(56) References Cited

U.S. PATENT DOCUMENTS

| | | |
|---|---|---|
| 3,990,807 * | 11/1976 | Sifford .................................. 415/115 |
| 5,267,831 | 12/1993 | Damiral . |
| 5,374,161 | 12/1994 | Kelch . |
| 5,584,651 * | 12/1996 | Pietraszkiewicz et al. .......... 415/115 |
| 5,649,806 * | 7/1997 | Scricca et al. ....................... 415/115 |

FOREIGN PATENT DOCUMENTS

| | | |
|---|---|---|
| 516322 | 12/1992 | (EP) . |
| 709550 | 5/1996 | (EP) . |
| 806815 | 12/1958 | (GB) . |
| 1524956 | 9/1978 | (GB) . |
| 2307520 | 5/1997 | (GB) . |

* cited by examiner

*Primary Examiner*—Edward K. Look
*Assistant Examiner*—Richard Woo
(74) *Attorney, Agent, or Firm*—W. Warren Taltavull; Farkas & Manelli PLLC

(57) ABSTRACT

Shrouds (40) surrounding a stage of turbine blades (44) are cooled by a compressor airflow which is led to the downstream end of the shrouds before contacting them. The airflow passes through apertures (56) in plates (50) then over the shrouds (40) in an upstream direction, to exit from apertures (62) in the shrouds (40) in parallel with and in the same direction as the gasflow. Airflow needed is reduced relative to prior art needs, resulting in improved engine efficiency, and ejection of the air does not disturb the gasflow.

6 Claims, 2 Drawing Sheets

TURBINE COOLING

CROSS REFERENCE TO RELATED APPLICATIONS

Not applicable.

The present invention relates to turbine machinery, particularly of the kind utilised in gas turbine propulsion engines.

More specifically, the invention relates to the improved cooling of such devices, especially in those engines used for the propulsion of aircraft, though not restrictively so.

BACKGROUND OF THE INVENTION

Field of the Invention

It is the common practice to provide compressor air for the purpose of cooling a multiplicity of turbine machinery parts. Thus, it is know to provide compressor air to shrouds, which in situ, surround a stage of turbine blades, and thereby form an outer wall of an associated turbine annulus in which in operation, the stage of blades rotates.

A first drawback to the know system is that it necessitates the provision of duel airflows, one for cooling the downstream ends of the shrouds, and another for cooling the upstream ends thereof. This results in the use of a quantity of air which consequently cannot be used for combustion, and further results in a noticeable drop in engine efficiency.

A second drawback in known structures is that the air used for cooling the upstream ends of the shrouds, by virtue of structure, could not be finally ejected into the gas stream in the annulus, without disturbing the flow. This added further to efficiency losses.

SUMMARY OF THE INVENTION

The present invention seeks to provide an improved mode of cooling blade shrouds in turbine machinery.

According to the present invention, turbo machinery for a gas turbine engine comprises a turbine blade shroud capped by a cover which is in spaced relationship therewith intermediate the shroud ends, said space being connectable via the downstream end of said cover, to a cooling airflow supply from a compressor of a said engine, and connectable via said shroud near the shroud upstream end, to the gas annulus of a said engine so as to, on driven connection to a said engine, eject said cooling airflow when effected, into the gas annulus, in parallel with, and in the direction of, the gas flow therethrough.

BRIEF DESCRIPTION OF THE DRAWINGS

The invention will now be described, by way of example, and with reference to the accompanying drawings in which.

DETAILED DESCRIPTION OF THE INVENTION

Figure 1:
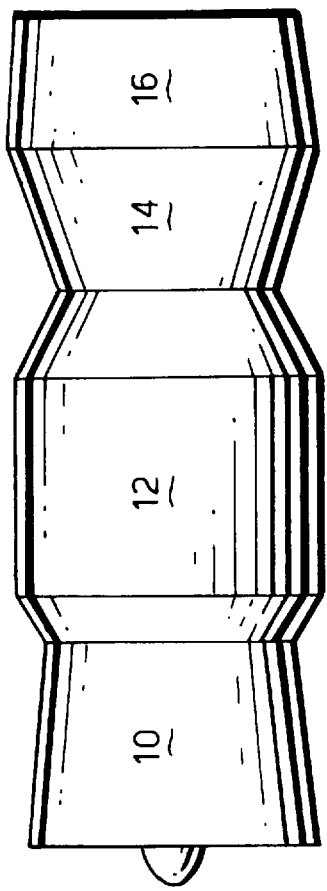
FIG. 1 is a diagrammatic view of a gas turbine engine including turbine machinery of the present invention.

Referring to FIG. 1. A gas turbine engine which includes turbine machinery in accordance with the present invention, has a compressor section 10, a combustion and fuel entry section 12 and a turbine section 14. The engine terminates in an exhaust nozzle 16. 20 Referring now to FIG. 2. The turbine section 12, has an outer casing 18 which includes internal annular flanges 20, 22. Each flange 20, 22 have respective annular grooves 24, 26.

Groove 24 supports the outer rim 28 of an annular groove 30 in the upstream end of the integral shroud 32 of a non rotatable guide vane 34.

By 'upstream' and 'downstream' is meant with respect to the direction of flow of gases through the engine of FIG. 1.

The inner rim 36 of the guide vane shroud 32 supports the downstream end 38 of a turbine blade shroud 40 in sliding relationship. Shaped sealing strips 39, 41 are fitted therebetween. The shroud 40 is spaced from the tip 42 of a turbine blade 44, and extends upstream and downstream thereof.

The inner rim 26 of the flange 22 supports the upstream end of the shroud 40, which in turn, carries an annular airflow restrictor 46, the operation of which is explained later in this specification. A shaped sealing strip 47 is fitted therebetween.

The shroud 40 has a number of fences 48 extending over the major portion of its length, intermediate its thickened ends, which fences are covered by a plate 50 which, with the fences 48, forms a number of closed, elongated passages 52 lying axially of the engine.

Figure 3:
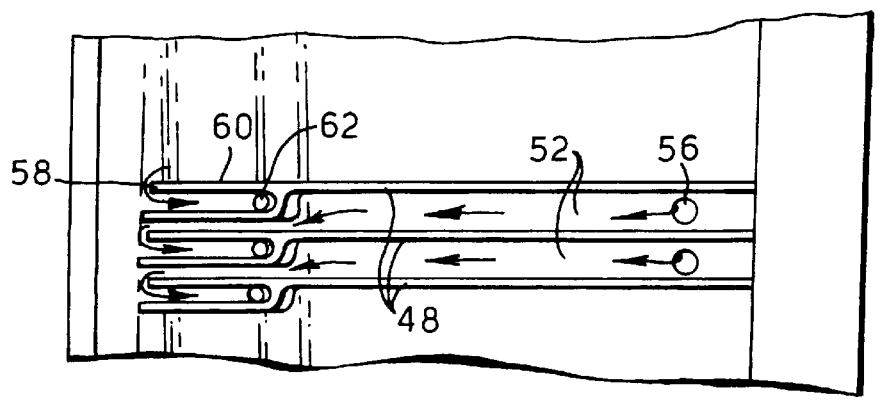
FIG. 3 is a view in the direction of arrow 3 in FIG. 2.

The passages 52 are best seen in FIG. 3. Only two passages 52 are shown therein, but in practice, there would be sufficient fences 48 to provide passages which would span the major portion of the width of the shroud 40 in a direction circumferentially of the turbine stage of which blade 44 forms a part.

The upstream ends of the fences 48 are forked, for reasons which are explained hereinafter.

Referring back to FIG. 2. In operation of the gas turbine engine, air is bled from the compressor 10 (FIG. 1) and led via a circumferential row of holes 54 in the restrictor 46, the space defined by the turbine casing 18 and plate 50, to a further row of holes 56, spanning the plate 50 at its downstream end. The air passes inwardly through the holes 56, into the passages 52, reversing its direction of flow, to flow along the passages 52, to their upstream end portions.

Figure 4:
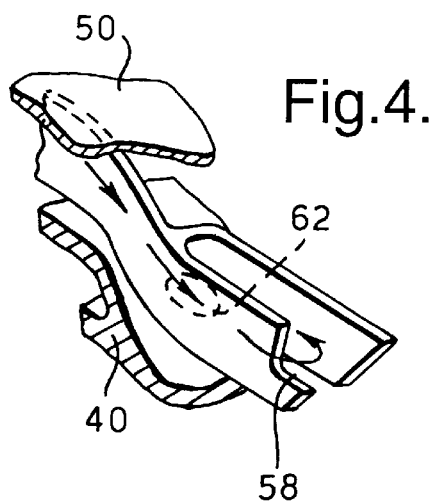
FIG. 4 is an enlarged pictorial part view of FIG. 2.

On reaching the upstream end portions of the passages 52, the airflow is constricted by narrowed passages defined by the forked portions of the fences 48. As a result, the airflow is re-energised at least in some small degree, prior to reaching a cutout 58 in the end extremity of one leg 60 in each fork. The cut out 58 is more clearly, seen in FIG. 4. The air passes through the cut outs 58 and again reverses its direction of flow, to exit from a row of holes 62 in the shroud 40, in the same direction as the gas flow through the turbine section 14, as is indicated by the arrow 64.

It will be seen from the foregoing description how a single compressor air supply can be utilised to cool both outer and inner surfaces of a turbine blade shroud, and further, be ejected therefrom into a region of the gas flow annulus, without disturbing the gas flow itself.

The present invention has been described with reference to only one shroud and an associated blade. However, the turbine stage will of course comprise a ring of turbine blades 44, and a ring of shrouds 40. Each shroud 40 may span one or more blades 44 in known manner, and, in accordance with the example of the particular present invention, will be provided with its own plate 50.

The fences 48 may be cast on the shroud 40 at the manufacturing stage thereof. However, the shroud 40 is not a rotating part, and consequently, to achieve minimum weight, appropriately shaped thin metal strips may be brazed or otherwise fixed thereon, to form the fences.

Figure 5:
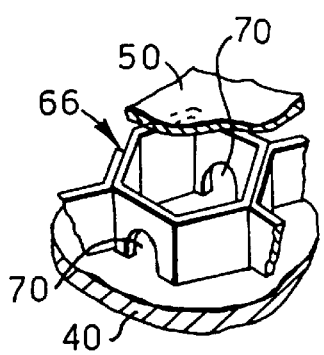
FIG. 5 is a pictorial part view of an alternative configuration to the device of FIGS. 2 and 3.

An alternative structure comprising a honeycomb core 66 (FIG. 5) could be substituted for the fences 48. The walls of the core 66 would have holes 70 in them, for the passage of cooling air through the core, towards the upstream end of the shroud 40.

Figure 6:
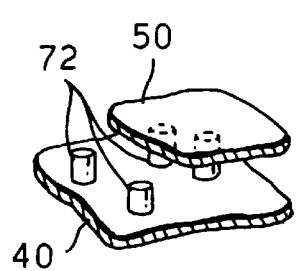
FIG. 6 is a pictorial part view of a further alternative configuration to the devices of FIGS. 2, 3, 4 and 5.

A further alternative to fences would provide pillars 72 depicted in FIG. 6 and which would separate the shroud 40 and plate 50. Air passing through the holes 56 would flow around the pillars 72 in a generally upstream direction, until it reached the exit holes 62 in the shroud 40. The pillars 72 are illustrated in straight form, but they could have any form, regular or irregular.

It is the common practice, to seal the gap between adjacent gas leakage by providing opposing slots in opposing shroud edges, and fitting a metal strip 74 therein, to bridge the gap. This is depicted in FIG. 7 and per se forms no part of the present invention.

Figure 7:
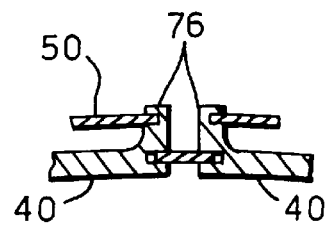
FIG. 7 is a cross sectional part view of a mode of retention of the cover of FIG. 2.

However, FIG. 7 also depicts a mode of retaining each plate 50 on its respective shroud 40, and consists of grooved edge portions 76 being provided along the side edges of each shroud 40, into which the side edges of the plate 50 are sprung.

The grooved edge portions need not extend the full length of the respective shrouds, but preferably would extend over a substantial portion of the edges of the aforementioned intermediate part thereof.

Despite the serpentine path which the compressor driven air has to follow between holes 54 and 62, a positive flow is maintained, helped by a pressure drop created at the exit ends of holes 62, by the passage of the high velocity gases thereby, in the direction indicated by arrow 64.

The cooling air is bled from one stage of compressor blades (not shown) in the associated engine, into a plenum (not shown) from where the cooling air passes to the apertures 54, then to the apertures 56. However, the cooling air could be piped from the plenum (not shown) by pipes (not shown) equal in number to apertures 56, and connected thereto, one pipe to one aperture 56.

Figure 2:
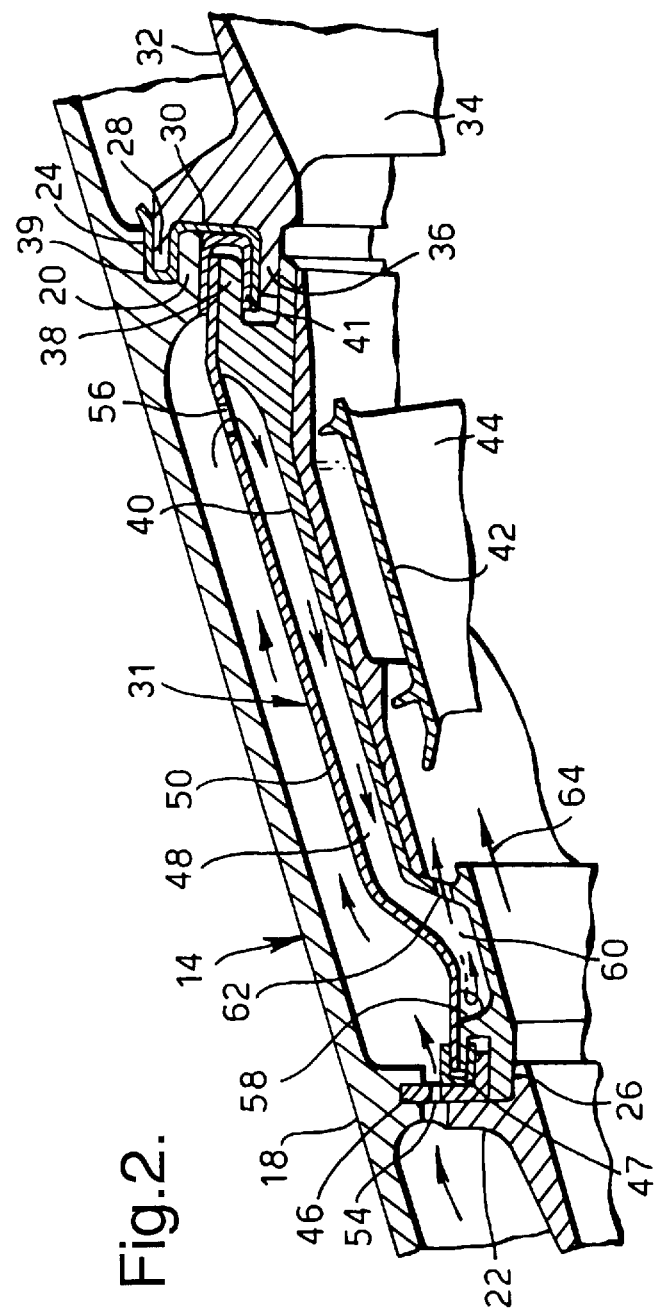
FIG. 2 is an axial cross section view through the turbine section of the engine of FIG. 1.

Hereinbefore, the cover is represented by plate 50. It could however, be a frusto conical member (not shown) having an axial cross-sectional shape identical with that of plate 50, as illustrated in FIG. 2.

What is claimed is:

1. Turbo machinery for a gas turbine engine having a gas annulus and comprising a turbine blade shroud, having upstream and downstream ends, a cover having a downstream end, said shroud being capped by said cover which is separated therefrom by a space intermediate said shroud ends, said space being connected via the downstream end of said cover to a cooling airflow supply from a compressor of said engine to provide a cooling airflow, and connected via said shroud near the shroud upstream end through exit apertures in said shroud, to the gas annulus of said engine, so as to, on operation of said engine when associated therewith, eject said cooling airflow when effected, into the gas annulus, in parallel with, and in the same direction as, the gas flow therethrough, said turbo machinery further including inlet and exit connections and a plurality of fences which extend for the full length of the space axially of said engine when associated therewith, which fences channel the airflow from the inlet connections to the exit connections, said fences having a fork shape at their upstream ends to define tines, one tine of each fork having a cutout at its end extremity, so as to enable airflow to enter between the tines and flow in a reversed direction to said exit apertures in the shroud.

2. Turbo machinery as claimed in claim 1 wherein said space being connected via the downstream end of said cover to a cooling airflow is provided by an airflow connection and said space being connected via said shroud near the shroud upstream end is provided by another airflow connection, said airflow connections comprising respective rows of apertures in the cover and the shroud, one row allowing airflow into the space at its downstream end, the other row allowing ejection of the airflow out of the space at its upstream end, in a reversed direction.

3. Turbo machinery as claimed in claim 1 including a plurality of pillars in said space and extending from the shroud to the cover, said pillars being spaced from each other so as to allow said cooling airflow therebetween, from cover inlet to shroud outlet.

4. Turbo machinery as claimed in claim 1 wherein the cover is a plate shaped to span at least one shroud circumferentially thereof.

5. Turbo machinery for a gas turbine engine having a gas annulus and comprising a turbine blade shroud, having upstream and downstream ends, a cover having a downstream end, said shroud being capped by said cover which is separated therefrom by a space intermediate said shroud ends, said space being connected via air inlets in the downstream end of said cover to a cooling airflow supply from a compressor of said engine to provide a cooling airflow, and connected via said shroud near the shroud upstream end through exit apertures in said shroud, to the gas annulus of said engine, so as to, on operation of said engine when associated therewith, eject said cooling airflow when effected, into the gas annulus, in parallel with, and in the same direction as, the gas flow therethrough, said machinery including a honeycomb core in said space, said core having a plurality of compartments, each compartment including holes in at least some of its walls, so as to permit a cooling airflow from said cover air inlets to said shroud exit apertures.

6. Turbo machinery for a gas turbine engine having a gas annulus, a turbine casing and comprising a turbine blade shroud, having upstream and downstream ends, a cover having a downstream end, said shroud being capped by said cover which is separated therefrom by a space intermediate said shroud ends, said space being connected via air inlets in the downstream end of said cover to a cooling airflow supply from a compressor of said engine to provide a cooling airflow, and connected via said shroud near the shroud upstream end through exit apertures in said shroud, to the gas annulus of said engine, so as to, on operation of said engine when associated therewith, eject said cooling airflow when effected, into the gas annulus, in parallel with, and in the same direction as, the gas flow therethrough and wherein said space being connected via the downstream end of said cover to a cooling airflow is provided by an airflow connection and said space connected via said shroud near the shroud upstream end being provided by another airflow connection, said airflow connections comprising respective rows of apertures in the cover and the shroud, one row allowing airflow into the space at its downstream end, the other row allowing ejection of the airflow out of the space at its upstream end, in a reversed direction, said cover having inlet apertures, the cooling airflow being directed to said cover inlet apertures via a flow path defined by the exterior surface of the cover and a portion of the surface of the turbine casing of said gas turbine engine when associated therewith.

\* \* \* \* \*